United States Patent [19]

Delvers et al.

[11] Patent Number: 5,574,659
[45] Date of Patent: Nov. 12, 1996

[54] DYE TRANSFER PRINTS UTILIZING DIGITAL TECHNOLOGY

[75] Inventors: Edward Delvers; Bruce Richardson; Sharon Brazil, all of Santa Barbara, Calif.

[73] Assignee: Chromax, Inc., Santa Barbara, Calif.

[21] Appl. No.: 322,942

[22] Filed: Oct. 12, 1994

[51] Int. Cl.⁶ ........................................... G03C 7/18
[52] U.S. Cl. ................................. 364/514 A; 430/383
[58] Field of Search .................. 364/514 A; 358/296, 358/350; 430/358, 383, 390; 355/326 R; 257/294

[56] References Cited

U.S. PATENT DOCUMENTS

| | | | |
|---|---|---|---|
| 3,969,115 | 7/1976 | Savia | 430/358 |
| 4,242,694 | 12/1980 | Koike et al. | 257/294 |
| 4,647,182 | 3/1987 | Pierce | 355/326 R |
| 5,335,082 | 8/1994 | Sable | 358/350 |
| 5,383,027 | 1/1995 | Harvey et al. | 358/296 |

*Primary Examiner*—Emanuel T. Voeltz
*Assistant Examiner*—Thomas Peeso
*Attorney, Agent, or Firm*—Michael G. Petit

[57] ABSTRACT

Motion picture prints made with the dye transfer, or imbibition (IB) process have a reputation for superior image quality and permanence. The process offers unique control over the dynamic range and color gamut of the prints. This invention provides for the insertion of a digital link in the traditional path of the image between the original record and the dye transfer print. The digital link provides digital means for alerting the color information in the image thereby simplifying the chemistry of the process, and enabling the manufacture of dye prints as a theatrical release medium for images originated either electronically or on film.

12 Claims, 1 Drawing Sheet

DYE TRANSFER PRINTS UTILIZING DIGITAL TECHNOLOGY

BACKGROUND OF THE INVENTION

1. Field of the Invention

This invention relates to production of color print film and, more particularly, to the use of digital imaging in the dye transfer process of color film printing.

2. Prior Art

Early color motion picture prints were made by depositing dyes on black and white film by timing individual frames by hand. Later, many alternative dye chemistries and mechanical methods of application were developed and evaluated by the industry. The dye transfer, or imbibition (IB) process, emerged as the preferred technology in color motion picture printing until around 1970, but was eventually displaced (starting in the 1950's) by the process of color-coupled development of dye intermediates incorporated in the film during manufacture.

In the dye transfer process, a colored image is formed when cyan, magenta and yellow dyes are transferred to blank stock from three different black and white positive separations made on matrix film. The image on matrix film exists in the form of a gelatin relief, consisting of a 3-dimensional topography of hills and valleys, the relief (or thickness) of which is proportional to image density. During the printing procedure, the matrix film is soaked in dye, rinsed to remove surface concentrations, and brought into registered contact with a mordanted blank. The dye diffuses from the matrix film into the blank to form a positive image; a colored picture appears after the third dye is transferred from its matrix film to the blank. In motion picture prints, the sound track and other coding marks can either be primed with dye or primed separately by other means, including means to provide a silver record.

Dye transfer prints have always been held in high regard in both the motion picture and still photography fields for their dynamic range, color gamut, and archival nature. Some of these advantages, compared to those of color-coupled film, are inherent in the materials and processing used to make a dye print. A review of the preparation of gelatinous film reliefs or "matrix film" and their use in the dye transfer method of producing print film is presented by Troland in British Patent 410,733. Goldberg et al., in U.S. Pat. No. 2,870,704, discuss the production of gelatin relief matrices for color printing. Other historically important patents relating to dye transfer printing using matrix film include U.S. Pat. Nos. 1,535,700; 1,900,140; 728,310; 2,044,864 and 2,930,691. British patent BP 187,638 provides a thorough treatise on dye transfer from start to finish.

A disadvantage of conventional dye transfer or IB printing is the difficulty and lack of flexibility in controlling color rendition. A system for producing color prim film which overcomes the above disadvantages and provides flexibility with respect to choice of matrix film, exposure, development, blank stock, mordant, dyes, transfer chemistry, and transfer equipment is desirable.

SUMMARY OF THE INVENTION

A dye transfer print is capable of a large dynamic range: the minimum density of a dye print is theoretically the density of the clear blank stock, and the maximum density can reach values of 5.0 due to the high concentrations of dye that can be transferred. Dye transfer printing offers the ability to alter the color gamut of the reproduction by using different dye combinations, an option not present in color-coupled film printing. Another advantage is the permanence of dye prints which is due, in part, to the stability of the dyes themselves, and in part to the simpler chemical processes of dye transfer that leave few residual contaminants in the print.

The present invention provides a dye transfer printing system that exploits the inherent advantages of the dye transfer process by applying recent developments in digital imaging to manipulate electronically generated images to generate edited digital images which can then be used for the generation of matrix film to control color rendition of dye transfer prints.

It is an object of this invention to provide a system for dye transfer printing of electronic images.

It is a further object of the invention to provide a system for dye transfer printing which permits the digital manipulation of an electronic image prior to dye transfer printing.

DESCRIPTION OF THE PREFERRED EMBODIMENT

Figure 1:
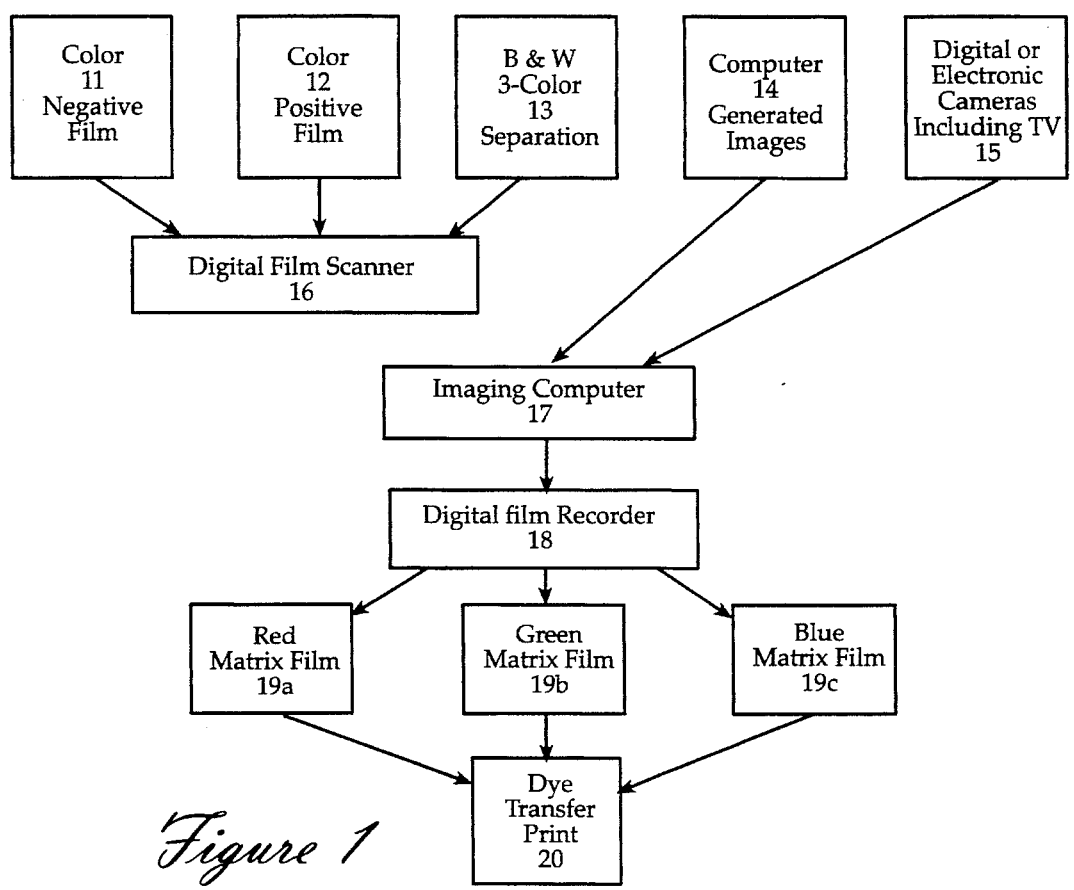
FIG. 1 shows a flow diagram of the system of the present invention utilizing digital imaging to generate matrix film.

Turning to FIG. 1, a schematic representation of the color printing system 10, in accordance with the present invention is shown. There are the five possible original sources of image data, including color negative film 11, color positive film 12, black and white 3-color separation film 13, computer generated images 14 and digital or electronic cameras, including TV 15. Color negative film 11 can be made in a camera, in which case it is called original camera negative, or it can result from other manipulations or copying processes. In any event, it is a color film in negative format. Color positive film 12 can be a camera original positive film such as using the technology used in taking slides or in making home movies which yield an original color positive or could be a reprint or a positive print from some other original source.

It is a common practice of studios and other film producers to make a black and white film record of their production in which the red, green and blue color separations are sequentially printed on a single strip of black and white film to be recombined to provide a color image when desired. This is usually a method of preservation and archiving because black and white film is known historically to have much higher longevity than color film in which dyes can fade and colors can shift. This black and white, 3-color separation film 13 may also be three separate black and white separations of an original scene which has been taken with a special camera so that the three red, green and blue images are recorded onto three separate black and white films. This was, in fact, the technique of the original Technicolor company process. Technicolor manufactured a camera that had three black and white films being run through simultaneously, each film being exposed to light which had been filtered and optically separated into three pathways to expose red, green and blue records separately onto the three films. These films differed in their sensitivity to light in such a way as to provide appropriate color records.

Because all of the blue record images were on one film, and all of the green record images were on a separate film, and all of the red record images were on yet another separate film, these films could be used to expose matrix film directly.

An image that can be printed by dye transfer does not have to be photographically obtained. It can be generated in a computer (not shown), which is becoming more prevalent, and is available or transmitted in the form of digital or electronic files. Such computer generated images 14 may be complete animations or the result of a creative imagination or comprise manipulations of existing digital computer images, including images taken or derived from photographic originals.

Digital cameras 15 which generate electronically originated photographic images are already present in the consumer market for still photography and in development for motion picture use where this camera (instead of a regular motion picture camera which uses film) can be brought out into the field. Current digital cameras employ optical and magnetic media to store data and can also include high definition television or high definition imaging. The information realistically captures an original scene, so that photographically this is similar in quality of image to color negative film 11 and color positive film 12. It has all three colors in it.

An object of our invention is to be able to digitally manipulate images, even when those images are not already represented in electronic form. This requires converting such images into electronic form from either color negative, color positive or 3-color separation film. A digital film scanner 16 is a machine that is commercially available that converts optical images into electronic format. Such digital film scanner machines are available, for example, from Kodak. The digital film scanner 16 scans motion picture or other photographic images electronically with a laser or with some other kind of sensing technology and converts it into electronic data which is stored in files or on magnetic tape, other magnetic media, other electronic media or in optical storage, either in analog form or digitally. Irrespective of how the digital film scanner 16 stores the photographic image (i.e. digitally or in analog form), it generates an electronic representation of the image. Generating an electronic representation of a visual image is the purpose of the scanner. In general, digital film scanners output digital data representing the red, green and blue separations.

The imaging computer 17 permits the manipulation of the exposure values as it were the mathematical representation of the image in respect to coloration, light intensity, dye density, and other characteristics. The imaging computer system 17, along with the software, mates the five possible image sources 11–15 with the matrix film 19a–c and subsequent dye transfer printing process. The imaging computer 17 receives its input in the form of electronic data either from a prerecorded tape or directly from a film scanner, or it can be a computer generated image, data storage or data stored or being actively transmitted from a computer. Likewise, with digital cameras 15 an electronic originated photographic image can be either prerecorded or even live. All electronic data from whichever source enters the imaging computer 17 and can then be manipulated and since the imaging computer has a record of which input device furnished the images, it can apply certain corrections based on the characteristics of that originating medium. Thus, one can actually compensate for color balance, idiosyncrasies of different types of color negative film, or different types of color positive film that have different color characteristics. This editing is performed in the imaging computer and produces an edited digital image. It is also possible to set up the data image, the data, so that it will most conveniently mate up with all the subsequent processes of matrix film printing and dye transfer printing which have properties which are difficult to otherwise chemically control. The imaging computer then outputs its data which is an edited digital image to a digital film recorder such as those which incorporate a high resolution cathode ray tube. Typically for 35 mm motion picture frame (four perforations long), the industry standard is a 4,000 pixel×3,000 pixel array, each pixel storing color data including the red, green and blue separation values with a data series representing the density, the brightness or the darkness of that particular color. This currently requires about 40 megabytes of data digitally per motion picture frame in 3 colors. The imaging computer can also be used to output to a laser film recorder instead of a CRT film recorder in which a picture is being made on a cathode ray tube. The laser recorder scans across the film to be printed with three different lasers, each having its own color. In a 3-color laser recorder there are typically red, green and blue lasers, but other wavelengths of laser light may be used. If a single laser is used that laser, of course, needs to have the same wavelength of light to which the matrix film is going to be sensitive so it can expose the matrix film. Digital film recorders are commercially available, for example, from Kodak (Lightning Model laser film recorder) and from other sources. CRT's can be purchased from Management Graphics, Inc., whose Solitaire Cathode Ray Tube Film Recorders are widely used in special effects houses and in special companies set up in the film industry that add rifles to the beginning and end of feature films. The film recorder then actually exposes motion picture film. Digital film records are also used in making still pictures The matrix film used in dye transfer preferably has a fine grain structure, strong stable base material, and contains a gelatin with proper mechanical and hardening characteristics. It can be panchromatic, orthochromatic, blue-sensitive, or of other sensitivity depending on the nature of the exposing light. Matrix film emulsions normally contain a blocking dye which is designed to limit the penetration of the exposing light through the film thickness. When the exposure is made through the base, the dye absorbs extraneous light and confines the latent image to the emulsion layer adjacent to the film substrate. Subsequent processing yields a relief image in gelatin that is attached to the base. The gelatin relief image must withstand repeated thermal cycling, mechanical pressure, abrasion, drying, wetting and chemical cleaning, and still be resilient, sharp, and able to repeatedly absorb and release dye. A suitable matrix film emulsion is Kodak 4150 Matrix Film, a blue-sensitive emulsion on polyester base made for the Kodak Dye Transfer paper print system. Tanning development, which is used for producing matrix film, makes use of the ability of certain developers to harden gelatin retaining an image. During processing, the oxidized developer reacts with the gelatin to cross link it in the vicinity of the developed silver grain. This renders the gelatin hard and less soluble than the gelatin of the unexposed, undeveloped areas of the emulsion. The unhardened and more soluble gelatin is removed by hot water in the final processing step, leaving behind the relief image. As in other black-and-white processing, the developer determines highlight and shadow detail, sharpness, grain, granularity, and contrast. In addition, tanning developers determine the gelatin thickness, gelatin sharpness, and gelatin hardness, all of which influence the transferred image.

In the system 10 in accordance with the present invention we use matrix film which is a film unique to dye transfer as described above. In a typical application one may use either three digital film recorders or have one digital film recorder which is used three times in succession to generate a red image matrix film, a green image matrix film and a blue image matrix film. In our present experimentation the matrix film used for this exposure is identical stock. In another application it may be desired that the red image matrix film is actually a different kind of color film emulsion-wise or color sensitivity-wise for various reasons from the blue and green image matrix films, and the blue might be a different kind of chemically composed film than the other two colors; and likewise with the green. The three matrix films exposed from the digital film recorder, when printed with the normal means of dye transfer, result in a dye transfer print 20. That print is unique inasmuch as the imaging computer has adjusted the exposure of the matrix to allow for corrections and changes, which would account for the characteristics of the matrix exposure system, matrix development differences, the dye chemistry and color, characteristics of gelatin absorption in the matrix and the blank, the kind of mordant used in the blank, transfer times and temperatures of the transfer process and, significantly, color timing.

Color timing is a color correction which is made during the course of printing motion pictures in which color is balanced to look uniform or for special effects in the print by altering the color balance of the original camera negative or the original negative presented for printing. This is normally done by inserting filters in the light source which is being used to expose the color film so that small color differences, for example, to match sunset and sunrise outdoor sunlight qualities to pictures taken of a similar scene during the midday sun, can be corrected so that a scene exposed under all three conditions can be almost made to look like they were shot during the same period of time. These corrections are routinely applied in the motion picture industry when prints are being made. It is called color timing, and this color timing is a set of directions that comes with an original that needs to be reproduced for release printing. This set of instructions can be incorporated into the digital imaging stage so that the imaging computer can make these corrections to the matrix exposure. This provides a means for handling a very routine movie industry practice of specifying color balance by incorporating it into dye transfer printing digitally at that stage.

Another significant correction which can be applied by imaging computer pertains to the color characteristics of the dyes being used. It is known that few, if any, dyes have spectral light absorption characteristics required to achieve theoretically perfect color reproduction in photographic processes. The unwanted absorption of the cyan, magenta and yellow dyes in regions outside of the portion of the spectrum represented by the red, green, and blue record images result in what are commonly known as color crossover effects. These effects prevent the accurate reproduction of color unless otherwise corrected. The normal method of correction is by the application of color masking, a technique in which the exposure (and consequent print densities) of each of the three separation images are altered to compensate for unwanted absorptions of the dyes. For example, a magenta dye with some absorption in the yellow region of the spectrum can be accommodated by decreasing the priming density of the yellow dye image in proportion to the density of the magenta dye image. Such corrections can be applied to compensate for the characteristics of all three dyes. This is currently accomplished by the use of contrast masking using separately exposed registered printing films or incorporated as part of the color emulsion dye chemistry. In using an imaging computer to prepare the exposure values of matrix film, it is significant that these color correction masking effects can be applied which correspond to the color crossover characteristics of the dye transfer system. Inasmuch as color crossover effects in dye transfer can be generated by the dyes themselves, and also in subsequent transfer procedures, all such crossover effects can be accommodated in the corrections applied by the imaging computer.

Various components of the developer affect the usefulness of the relief image for dye transfer. These include: tanning developers for the main tanning action, additive developers to increase matrix film speed, restrainers for fog control, alkali to control the reaction rate, anti-oxidants as preservatives, surfactants to modify the diffusion rate, sequestering agents to prevent precipitation, gelatin hardness modifiers, silver solvents to enhance sharpness, salts to control gelatin swelling, and anti-microbials, fungicides, and antiseptics for good keeping properties. After treatments can also change the properties of the relief image and alter the behavior of the transfer.

Figure 2:
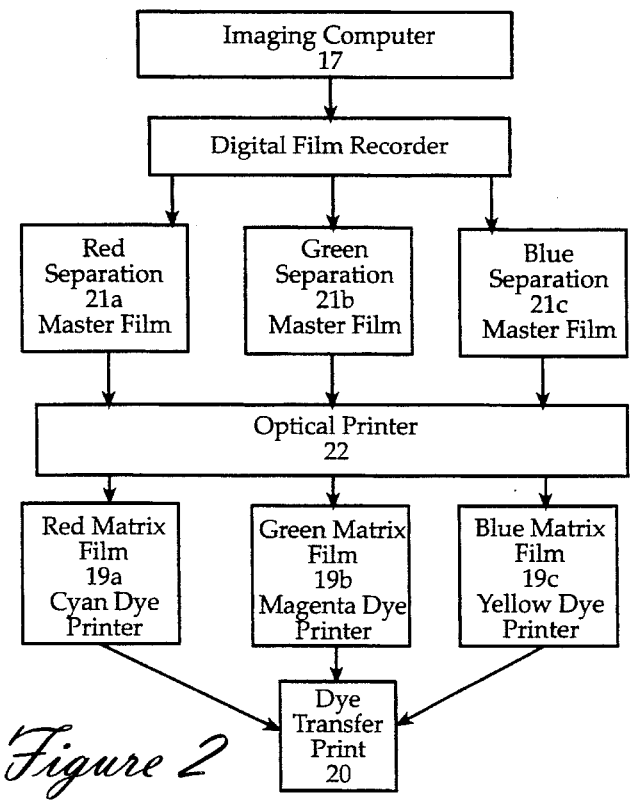
FIG. 2 shows a schematic diagram of the system configured to produce an intermediate film separation prior to the generation of matrix film.

Turning now to FIG. 2 wherein everything is the same upstream to the imaging computer then we have introduced a set of color separation printing masters for matrix film, the red 21*a*, the green 21*b* and the blue 21*c* separation master films. Such separation master films can be exposed by any type of film recorder, including certain electronic digital film recording devices which could not efficiently expose matrix film directly but could expose specialty film which had been manufactured to work well with that electronic exposure system. One of such devices is an electron beam recorder. The electron beam recording type of device does not efficiently expose matrix film, as it is normally exposed through the base. With the digital imaging link it is now possible to incorporate all the corrections required for the exposure of matrix film in the format of the output of electron beam film recorders, such as black and white separation film. These are black and white film negative images or positives. The master films 21*a–c* may then be printed optically (that is, with a lens) directly onto the matrix film, 1 for 1, or by direct contact such as in a step printer. There are two advantages to this system. The first is that the separation master film can be used repeatedly to make extra matrix copies should they wear out in the normal course of making dye transfers or be damaged. If multiple matrix films need to be exposed simultaneously to run on separate transfer machines to make high volumes of films simultaneously, a separation master film is useful for making copies and more economical rather than running a digital film recorder full time. A second option that separation master film gives is that the optical printer 22 which would normally be used to make a one-to-one record onto matrix film, can be used to enlarge, reduce or otherwise change the size or look of the image on master film. With the digital link it is possible to print a 70 mm matrix film from 35 mm format master film negative or vice versa, preserving the information of the edited digital image. There are various prior art means for generating different film formats. Optically, there is the anamorphic method where images are squeezed vertically or horizontally during taking or during processing and then "unsqueezed" or expanded by a special lens in the theater so that with a relatively narrow strip of film one can show a very wide picture on the screen. With an optical printer we can quite easily generate various kinds of formats of matrix films for producing prints of different formats.

There are advantages to making dye transfer print matrix film exposures with all the manipulations, and there are primarily two techniques: one to use digital imaging to directly expose matrix film, and the second to make an intermediate black and white film which can add flexibility in both directions, being able to use a different kind of film recording device and secondly to come up with different formats of output and the idea that the separation master films can be used repeatedly for copying. That separation master film also, incidentally, is an archival record in red, green and blue imaging with black and white film.

Other methods of relief image formation in matrix film include reversal of exposures made on the emulsion side, selective hardening without gelatin removal to produce variable dye absorption, and hardening with alternative chemistry.

The blank film, in which the image is formed by dyes that diffuse into it from the matrix film during dye transfer, must have the ability to attract and retain dye. Gelatin emulsions have some inherent dye affinity, but not enough to render a sharp image by preventing the diffusion of dye sideways within the blank after the transfer. The addition of mordants to the emulsion increases the dye affinity of the blank and improves the resolution of the transferred image.

Mordants are chemical structures contained within, or bonded to the emulsion of the blank that attract and anchor dye molecules. They often have charged sites to which dyes can attach more quickly and strongly than they do to the emulsion itself. Mordants directly affect the transfer rate and dye density. The choice of mordants ranges from metallic salts to polymers, either applied by aftertreatment or incorporated in the stock during manufacture. An example of a suitable blank is fixed-out black and white polyester-base stock, including Agfa 561 and Kodak SO-202, both aftertreated with mordants. Resolution might be improved with the incorporation of mordants directly into the blank.

In the system 10 described herein the choice of a suitable dye system is important. desirable dye system consists of a water-based chemistry with compatible dyes that will transfer and remain sharp. The dyes should have good spectral absorption, mordant compatibility, good transfer characteristics, color fastness during projection, and stability in storage. Single-component dye solutions represent the simplest chemistry. In practice, however, dyes have overlapping spectral absorptions, and some form of color correction is desirable. In dye transfer printing, the usual photomechanical technique of color correction with color masking is a tedious procedure involving registered contrast masks and intermediate negatives. Another technique of color correction unique to dye transfer is the alteration of the dye solutions to change the color rendition. This does not provide color masking by compensating for unwanted absorptions in the dyes, but it can be used to provide some correction when the use of contrast masks in printing is impractical. In fact, this ability of altering the color gamut of the image is one of the advantages of the dye transfer process.

For many applications, single-component solutions of anionic dyes are suitable. These are of the type commercially classified as acid and direct dyes, which have traditionally been used in dye printing and are supported by a wealth of research from the textile and printing industries. In addition to the colors which are commercially available, dyes can be synthesized for specific spectral and transfer characteristics.

Incorporated digital imaging into a dye transfer process serves two purposes. First, from the point of view of film, it allows the convenient application of color correction and color control when printing from film originals of all kinds. It offers an unprecedented ability to apply color masking corrections directly during matrix exposure. With the color display technology available today, it is possible to represent the visual effects of color corrections and dye substitutions on a viewing screen before the matrix is generated. Second, from the point of view of electronically originated images, such as from video cameras or computers, digital imaging provides a means of producing a motion picture print directly from digital files without going through a color intermediate film stage with materials designed to reproduce images originated on film. The color gamut is not limited to the range that can be recreated with cyan, magenta and yellow dyes alone.

There are at least two methods for generating matrix film images with digitally applied corrections. The first method is the direct exposure of matrix film with a digital output device such as a film recorder. The present inventors performed preliminary experiments with cathode ray tube (CRT), laser, and electron beam recording (EBR) devices and found that CRT recorders can expose matrix film, although it is a slow process due to the low film speed. Longer exposures can produce sharp pictures within their limits of operation. Laser film recorders can also expose matrix film. With EBR exposure, the electrons were absorbed by the film base and useful images could not be made directly.

The second method employs the two-stage insertion of a digital processing step, through the creation of a digitally corrected and mastered separation negative for printing matrix film optically. Some generation loss is associated with this technique, yet it has the advantage of resulting in a printing master for duplicate matrix sets. By optical printing, matrix film can be generated in a variety of formats.

In either approach, the matrix exposure incorporates the corrections needed to standardize many previous and subsequent steps in the process including color timing, image contrast, matrix sensitometry, development, dye chemistry, gelatin absorption, blank preparation, transfer time, temperature, mordant, and other variables.

Once the matrix films are made, the successful printing of images depends on accurate mechanical processes including registration of the film matrix and blank, the contact procedure, and the maintenance of temperature and pressure during transfer. Chemical conditions including pH differences between the two films, pre-treatment of blank stock, dye concentration, properties of the mordant, transfer time, and temperature also affect the transfer efficiency.

For manual transfers, the present inventors found it convenient to set up the chemistry for batch processing, with most of the reactions going to completion. In scaling the results for continuous processing, where the chemistry is adjusted for reactions that do not necessarily go to completion, feedback control of the transfer process can maintain consistency and allow some final adjustments in color balance during the transfer procedure. Test transfers were made manually on a thermostatically controlled register board that accommodates 35, 65 and 70 mm film segments with interchangeable pin strips in a variety of perforations and pitches. The registration takes place on full fit pins in every perforation on one edge of the film, and on traveling pins on the opposite edge. The pin strips are machined for a total cumulative error of 0.0015 inches (0.04 mm) over the film length of 24 inches (61 cm). Transfer times are typically 1 to 4 minutes at 85° F. (30° C.) to 140° F. (60° C.).

The foregoing system provides an improvement in dye transfer printing. The improvement comprises a digital interface which makes possible a standardization of processing while, at the same time, providing a way of previsualizing and optimizing the color gamut of a dye system. It also provides an output capability for electronically originated images that bypasses any color intermediate film stage. The instant system generates matrix film through the intermediate of digital imaging techniques and permits electronic color balance (instead of optically and chemically). Because the digital correction is different in range and nature than the chemical and optical corrections traditionally available, it is possible to have more finely adjusted variables in a dye priming system.

Matrix film is generally referred to herein as a relief image but, the matrix film need not be limited to a 3-dimensional typography but may be planographic or even semi-planographic. Planographic means that the matrix film is of equal thickness throughout and that the variation in dye density being either imbibed or transferred is proportional to certain characteristics within that single thickness, such as gelatin hardness or gelatin chemical condition or gelatin oil and water repellent characteristics. These so-called planographic matrixes are known in the art. The above-described system may be used with planographic matrix film. The advantage of planographic matrix film is that because it is flat, the problems associated with a true relief image, such as entrapment of air bubbles, or most seriously the loss of resolution because of the actual deformation of the relief image under the pressure applied by rollers during transfer are minimized.

While particular embodiments of the present invention have been illustrated and described, it would be obvious to those skilled in the art that various other changes and modifications can be made without departing from the spirit and scope of the invention. For example, while the use of the system for producing release prints for motion pictures has been described, this application is not meant to be limiting. The system and process employing digital imaging in the dye transfer process may also be used for producing dye transfer prints other than release prints such as special effects films or color masters for video duplication. While the principal applications for the system and process is motion picture printing, the system and process may be used for still picture dye transfer printing as well. It is therefore intended to cover in the appended claims all such changes and modifications that are within the scope of this invention.

What we claim is:

1. In a prior art dye transfer printing process for generating motion picture film print wherein said prior art dye transfer printing process comprises the steps of;
   (a) presenting a film bearing a color image;
   (b) generating at least one color-separated matrix film from said film bearing a color image;
   (c) applying a dye to said at least one color-separated matrix film wherein said dye has color crossover characteristics particular to said dye; and
   (d) bringing said matrix film into registrable contact with a blank film until a portion of said dye in said matrix film is imbibed by said blank film to form a color prim of said color image, the improvement comprising the additional step of generating a digital representation of said color image and inputting said digital representation of said color image into a computer means operable for manipulating said digital representation of said color image and manipulating said digital representation of said color image by said computer means to generate a color corrected edited digital image, then using said color corrected edited digital image to generate at least one color-separated matrix film as in step (b) above.

2. The improvement of claim 1 wherein said computer means further comprises means for outputting said edited digital image onto a digital film recorder.

3. The improvement of claim 2 wherein said digital film recorder is operable for generating at least one color-separated matrix film.

4. A system for producing color balanced dye transfer printed release film from a film bearing a color image comprising:
   (a) a digital film scanner operable for receiving said film bearing a color image and generating a digital representation of said color image and presenting said digital representation of said color image at an output;
   (b) a programmer computer means operable for receiving said digital representation of said color image from said digital film scanner and manipulating said digital representation of said color image to produce a color-corrected edited digital print image;
   (c) means for producing a matrix film from said color-corrected edited digital print image;
   (d) transfer printing means operable for preparing dye transfer prints from said matrix film.

5. The system of claim 4 further comprising means for visually monitoring manipulated said edited digital print image.

6. The system of claim 4 wherein said matrix film is relief matrix film.

7. The system of claim 4 wherein said matrix film is planographic matrix film.

8. The system of claim 4 wherein said matrix film is manufactured to be compatible to the spectral characteristics of the exposing radiation of said means for recording said edited digital prim image.

9. The system of claim 4 wherein said dye transfer prints are in the form of still pictures.

10. The system of claim 4 wherein said dye transfer prints are in the form of motion pictures.

11. A system operable for preparing color balanced film release prints in accordance with claim 4 wherein said system further comprises programmable computer means operable for manipulating said edited digital image to correct for variable characteristics inherent in materials and components other than said dye, said materials and components being used in performing said dye transfer process.

12. A system for producing color balanced dye transfer printed release film from a electronically generated digital color image comprising:
   (a) a programmable computer means operable for receiving said digital representation of said color image and manipulating said digital representation of said color image to produce a color-corrected edited digital print image;
   (b) means for recording said edited digital print image;
   (c) means for producing a color separated matrix film from said color-corrected edited digital print image;
   (d) dye transfer printing means operable for preparing dye transfer prints from said color separated matrix film.

* * * * *